(12) United States Patent
Lee et al.

(10) Patent No.: US 12,353,894 B2
(45) Date of Patent: Jul. 8, 2025

(54) ELECTRONIC DEVICE PRELOADING ABNORMAL APPLICATION IN BACKGROUND, AND OPERATION METHOD THEREOF

(71) Applicant: Samsung Electronics Co., Ltd., Suwon-si (KR)

(72) Inventors: Changho Lee, Suwon-si (KR); Byoungkug Kim, Suwon-si (KR); Kwangtaek Woo, Suwon-si (KR); Deukkyu Oh, Suwon-si (KR); Jinwan An, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 68 days.

(21) Appl. No.: 18/352,707

(22) Filed: Jul. 14, 2023

(65) Prior Publication Data
US 2023/0359473 A1    Nov. 9, 2023

Related U.S. Application Data

(63) Continuation of application No. PCT/KR2021/003222, filed on Mar. 16, 2021.

(30) Foreign Application Priority Data

Feb. 16, 2021    (KR) .................. 10-2021-0020569

(51) Int. Cl.
*G06F 11/00*    (2006.01)
*G06F 9/445*    (2018.01)
(Continued)

(52) U.S. Cl.
CPC ........ *G06F 9/44578* (2013.01); *G06F 11/004* (2013.01); *G06F 11/07* (2013.01); *G06F 11/0793* (2013.01); *G06F 11/302* (2013.01)

(58) Field of Classification Search
CPC .... G06F 11/004; G06F 11/07; G06F 11/0793; G06F 11/302; G06F 11/14; G06F 11/30;
(Continued)

(56) References Cited

U.S. PATENT DOCUMENTS 9,626,219 B2    4/2017  Shimizu
10,038,761 B1*  7/2018  Lekkalapudi ....... H04L 67/5681
(Continued)

FOREIGN PATENT DOCUMENTS

JP    2000/132428 A    5/2000
KR    10-2001-0064807 A    7/2001
(Continued)

OTHER PUBLICATIONS

International Search Report and written opinion dated Apr. 11, 2021, issued in International Patent Application No. PCT/KR2021/003222.

*Primary Examiner* — Amine Riad
(74) *Attorney, Agent, or Firm* — Jefferson IP Law, LLP

(57) ABSTRACT

An electronic device is provided. The electronic device includes a memory configured to store at least one application, a database storing determination criteria information to determine an abnormal operation of the at least one application, and an agent configured to control a process of the at least application, and a processor, coupled to the memory, configured to execute the agent, in which, when executing the agent, the processor is configured to receive state information related to the abnormal operation of the at least one application from an operating system (OS), determine a target application from the at least one application in which an abnormal operation is expected based on the determination criteria information, and preload the target application in a background.

15 Claims, 7 Drawing Sheets

(51) Int. Cl.
*G06F 11/07* (2006.01)
*G06F 11/30* (2006.01)

(58) Field of Classification Search
CPC ............ G06F 11/0715; G06F 11/0775; G06F 11/1438; G06F 11/1482; G06F 11/3058
See application file for complete search history.

(56) References Cited

U.S. PATENT DOCUMENTS

| | | | |
|---|---|---|---|
| 2014/0068627 A1* | 3/2014 | Goh | G06F 9/5094 |
| | | | 718/105 |
| 2016/0147580 A1 | 5/2016 | Shimizu | |
| 2017/0277462 A1 | 9/2017 | Zhang et al. | |
| 2019/0179726 A1* | 6/2019 | Hou | H04L 43/0876 |
| 2021/0232429 A1* | 7/2021 | Li | G06F 9/4881 |
| 2021/0397461 A1* | 12/2021 | Iyer | G06F 9/44521 |

FOREIGN PATENT DOCUMENTS

| | | |
|---|---|---|
| KR | 10-0640243 B1 | 11/2006 |
| KR | 10-2016-0116910 A | 10/2016 |
| KR | 10-2017-0000619 A | 1/2017 |
| KR | 10-2017-0097941 A | 8/2017 |
| KR | 10-2018-0037342 A | 4/2018 |
| KR | 10-2037479 B | 10/2019 |
| WO | 2019/223540 A1 | 11/2019 |

\* cited by examiner

ELECTRONIC DEVICE PRELOADING ABNORMAL APPLICATION IN BACKGROUND, AND OPERATION METHOD THEREOF

CROSS-REFERENCE TO RELATED APPLICATION(S)

This application is a continuation application, claiming priority under § 365(c), of an International application No. PCT/KR2021/003222, filed on Mar. 16, 2021, which is based on and claims the benefit of a Korean patent application number 10-2021-0020569, filed on Feb. 16, 2021, in the Korean Intellectual Property Office, the disclosure of which is incorporated by reference herein in its entirety.

BACKGROUND

1. Field

The disclosure relates to an electronic device for preloading an abnormal application in the background and an operating method thereof.

2. Description of Related Art

An application executed in a terminal may load various resources, generate a process, load necessary data through a storage medium or a network, and generate an activity for interacting with a user and display the activity on a screen.

An abnormal operation, such as a sluggish operation, the application not responding (ANR), or a crash, may occur due to various problems when or while executing the application.

The above information is presented as background information only to assist with an understanding of the disclosure. No determination has been made, and no assertion is made, as to whether any of the above might be applicable as prior art with regard to the disclosure.

SUMMARY

When an abnormal operation, such as a sluggish operation, the application not responding (ANR), or a crash, occurs while driving an application, a user may need to terminate and restart the application.

Aspects of the disclosure are to address at least the above-mentioned problems and/or disadvantages and to provide at least the advantages described below. Accordingly, an aspect of the disclosure is to provide an electronic device for preloading an application in the background when an abnormal operation is expected.

Additional aspects will be set forth in part in the description which follows and, in part, will be apparent from the description, or may be learned by practice of the presented embodiments.

In accordance with an aspect of the disclosure, an electronic device is provided. The electronic device includes a memory including at least one application, a database storing determination criteria information to determine an abnormal operation of the at least one application, and an agent configured to control a process of the at least one application, and a processor coupled to the memory and configured to execute the agent to receive state information related to the abnormal operation of the at least one application from an operating system (OS), determine a target application from the at least one application in which an abnormal operation is expected based on the determination criteria information, and preload the target application in a background.

In accordance with another aspect of the disclosure, an operating method of an electronic device is provided. The operating method includes receiving state information related to an abnormal operation of at least one application from an OS, determining a target application from the at least one application in which an abnormal operation is expected based on determination criteria information to determine the abnormal operation of the applications that are stored in a database, and preloading the target application in a background.

In accordance with another aspect of the disclosure, a non-transitory computer-readable recording medium is provided. The non-transitory computer-readable recording medium includes a program which, when executed by a processor of an electronic device, causes the processor to control the electronic device to receive state information related to an abnormal operation of at least one application from an OS, determine a target application from the at least one application in which an abnormal operation is expected based on determination criteria information to determine the abnormal operation of the at least one application stored in a database, and preload the target application in a background.

According to embodiments, user convenience may increase by expecting an abnormal operation of an application and preloading a process in the background.

In addition, various effects directly or indirectly ascertained through the disclosure may be provided.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings, is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
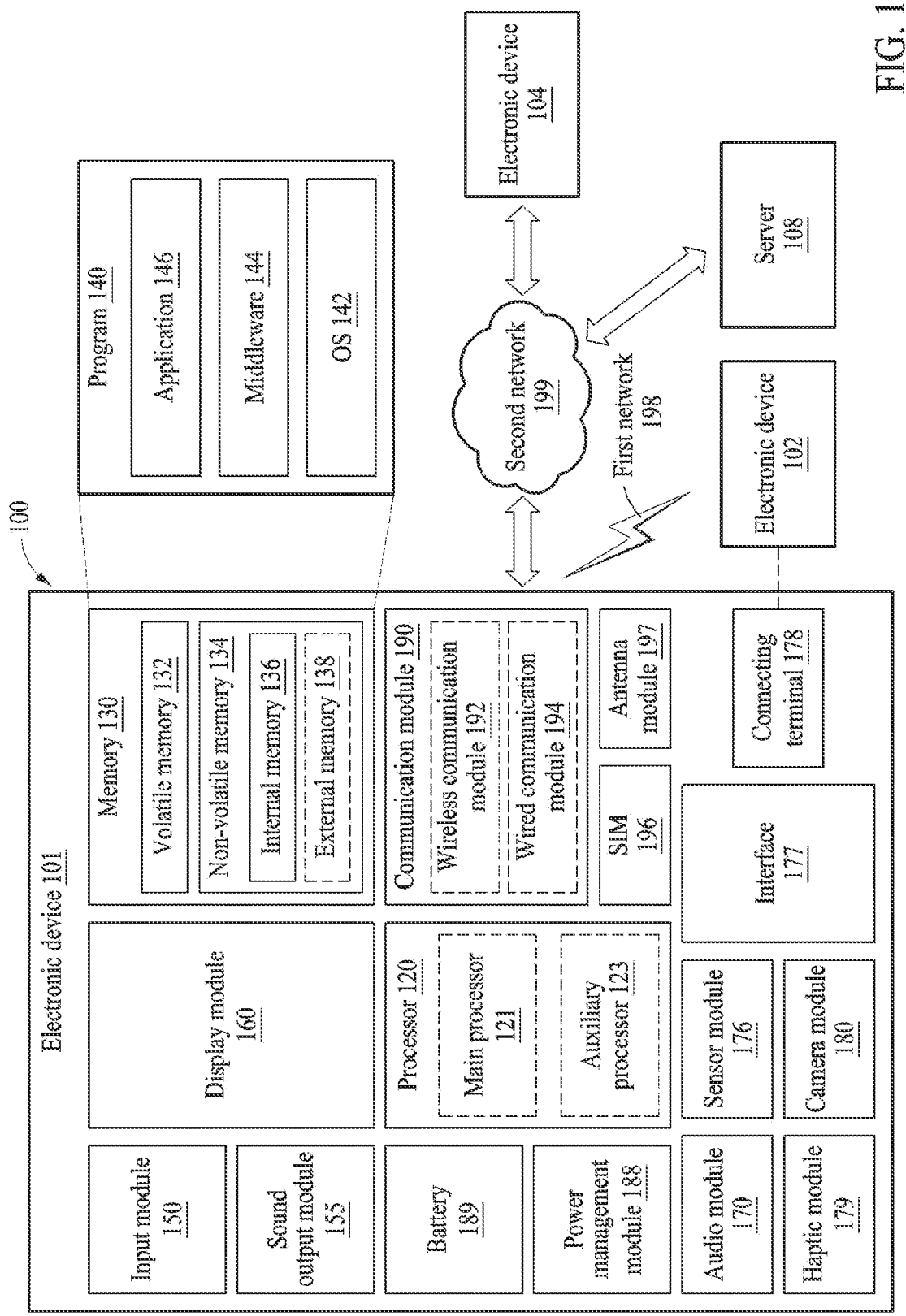
FIG. 1 is a block diagram illustrating an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the above components may be omitted from the electronic device 101, or one or more other components may be added in the electronic device 101. In some embodiments, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an embodiment, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently from, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented as separate from, or as part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an ISP or a CP) may be implemented as part of another component (e.g., the camera module 180 or the communication module 190) functionally related to the auxiliary processor 123. According to an embodiment, the auxiliary processor 123 (e.g., an NPU) may include a hardware structure specified for artificial intelligence model processing. An artificial intelligence model may be generated through machine learning. Such learning may be performed, for example, by the electronic device 101 in which an artificial intelligence model is executed, or via a separate server (e.g., the server 108). Learning algorithms may include, but are not limited to, for example, supervised learning, unsupervised learning, semi-supervised learning, or reinforcement learning. The artificial intelligence model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), a bidirectional recurrent deep neural network (BRDNN), a deep Q-network, or a combination of two or more thereof, but is not limited thereto. The artificial intelligence model may additionally or alternatively include a software structure other than the hardware structure.

The memory 130 may store various pieces of data used by at least one component (e.g., the processor 120 or the sensor module 176) of the electronic device 101. The various pieces of data may include, for example, software (e.g., the program 140) and input data or output data for a command related thereto. The memory 130 may include the volatile memory 132 or the non-volatile memory 134.

The program 140 may be stored as software in the memory 130 and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to sense a touch, or a pressure sensor adapted to measure the intensity of force incurred by the touch.

The audio module 170 may convert a sound into an electrical signal and vice versa. According to an embodiment, the audio module 170 may obtain the sound via the input module 150 or output the sound via the sound output module 155 or an external electronic device (e.g., the electronic device 102 such as a speaker or headphones) directly or wirelessly connected to the electronic device 101.

The sensor module 176 may detect an operational state (e.g., power or temperature) of the electronic device 101 or an environmental state (e.g., a state of a user) external to the electronic device 101, and generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., by wire) or wirelessly. According to an embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or an electrical stimulus which may be recognized by a user via his or her tactile sensation or kinesthetic sensation. According to an embodiment, the haptic module 179 may include, for example, a motor, a piezoelectric element, or an electric stimulator.

The camera module 180 may capture a still image and moving images. According to an embodiment, the camera module 180 may include one or more lenses, image sensors, ISPs, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently of the processor 120 (e.g., an AP) and that support a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., a LAN or a wide area network (WAN)). These various types of communication modules may be implemented as a single component (e.g., a single chip), or may be implemented as multiple components (e.g., multiple chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), an array antenna, analog beamforming, or a large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 gigabits per second (Gbps) or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., an external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or power may be transmitted or received between the communication module 190 and the external electronic device via the at least one selected antenna. According to an embodiment, another component (e.g., a radio frequency integrated circuit (RFIC)) other than the radiating element may be additionally formed as part of the antenna module 197.

According to an embodiment, the antenna module 197 may form a mmWave antenna module. According to an embodiment, the mmWave antenna module may include a PCB, an RFIC disposed on a first surface (e.g., the bottom surface) of the PCB or adjacent to the first surface and capable of supporting a designated high-frequency band (e.g., the mmWave band), and a plurality of antennas (e.g., array antennas) disposed on a second surface (e.g., the top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 and 104 may be a device of the same type as or a different type from the electronic device 101. According to an embodiment, all or some of operations to be executed at the electronic device 101 may be executed at one or more of external electronic devices (e.g., the external electronic devices 102 and 104, or the server 108). For example, if the electronic device 101 needs to perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or MEC. In an embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., a smart home, a smart city, a smart car, or healthcare) based on 5G communication technology or IoT-related technology.

Figure 2:
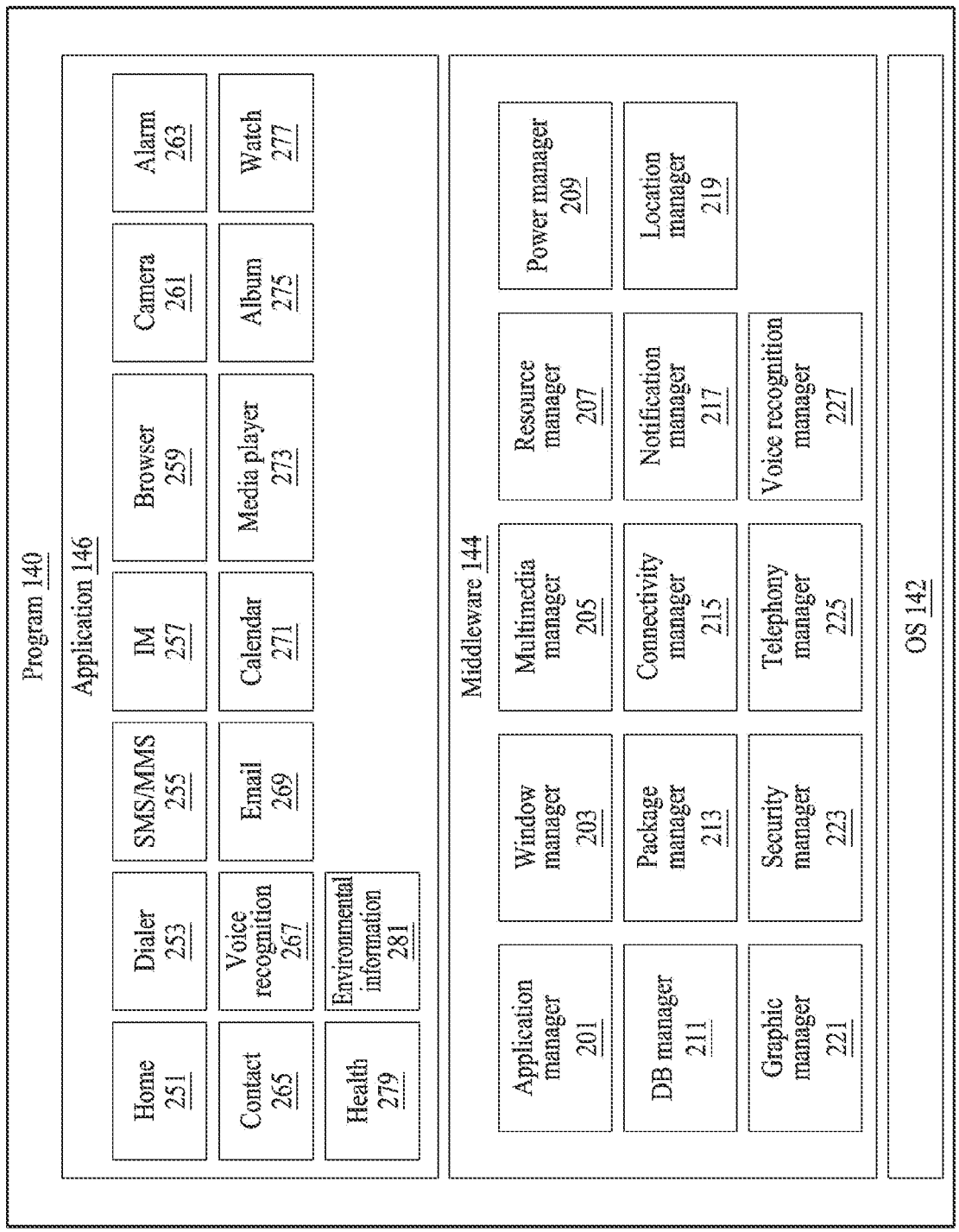
FIG. 2 is a block diagram illustrating a program according to an embodiment of the disclosure.

FIG. 2 is a block diagram 200 illustrating a program 140 according to an embodiment of the disclosure. According to an embodiment, the program 140 may include an OS 142 to control one or more resources of the electronic device 101, middleware 144, or an application 146 executable in the OS 142. The OS 142 may include, for example, Android™, iOS™, Windows™, Symbian™, Tizen™, or Bada™ At least part of the program 140, for example, may be preloaded on the electronic device 101 during manufacture, or may be downloaded from or updated by an external electronic device (e.g., the electronic device 102 or 104, or the server 108) during use by a user.

The OS 142 may control the management (e.g., allocation or deallocation) of one or more system resources (e.g., a process, a memory, or a power source) of the electronic device 101. The OS 142 may additionally or alternatively include at least one other drive program to drive other hardware devices of the electronic device 101, for example, the input module 150, the sound output module 155, the display module 160, the audio module 170, the sensor module 176, the interface 177, the haptic module 179, the camera module 180, the power management module 188, the battery 189, the communication module 190, the SIM 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database (DB) manager 211, a package manager 213, a connectivity manager 215, a notification manager 217, a location manager 219, a graphic manager 221, a security manager 223, a telephony manager 225, or a voice recognition manager 227.

The application manager 201 may, for example, manage the life cycle of the application 146. The window manager 203, for example, may manage one or more GUI resources that are used on a screen. The multimedia manager 205, for example, may identify one or more formats to be used to play media files and may encode or decode a corresponding media file of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and may determine or provide related information to be used for the operation of the electronic device 101 based on at least in part on corresponding information of the capacity, temperature, or power of the battery 189. According to an embodiment, the power manager 209 may interwork with a basic input/output system (BIOS) (not shown) of the electronic device 101.

The database manager 211, for example, may generate, search, or change a database to be used by the application 146. The package manager 213, for example, may manage the installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, a message, or an alert). The location manager 219, for example, may manage location information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit a user's voice data to the server 108 and may receive, from the server 108, a command corresponding to a function to be executed by the electronic device 101, based at least in part on the voice data or text data converted based at least in part on the voice data. According to one embodiment, the middleware 144 may dynamically delete some existing components or add new components therefrom or thereto. According to one embodiment, at least part of the middleware 144 may be included as part of the OS 142 or may be implemented as another software separate from the OS 142.

The application 146 may include, for example, a home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to an embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of an external electronic device that communicates with the electronic device 101 or a portion of components thereof (e.g., a display module or a camera module of the external electronic device). The device management application may additionally or alternatively support the installation, deletion, or update of an application running on the external electronic device.

It should be appreciated that embodiments of the disclosure and the terms used therein are not intended to limit the technological features set forth herein to particular embodiments and include various changes, equivalents, or replacements for a corresponding embodiment. As used herein, each of such phrases as "A or B", "at least one of A and B", "at least one of A or B", "A, B or C", "at least one of A, B and C", and "at least one of A, B, or C", may include any one of, or all possible combinations of the items enumerated together in a corresponding one of the phrases. As used herein, such terms as "$1^{st}$" and "$2^{nd}$," or "first" and "second" may be used to simply distinguish a corresponding component from another, and does not limit the components in other aspect (e.g., importance or order). It is to be understood that if a component (e.g., a first component) is referred to, with or without the term "operatively" or "communicatively", as "coupled with", "coupled to", "connected with", or "connected to" another component (e.g., a second component), it means that the component may be coupled with the other component directly (e.g., by wire), wirelessly, or via a third component.

As used in connection with embodiments of the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include code generated by a compiler or code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to embodiments of the disclosure may be included and provided in a computer program product. The computer program product may be traded as a product between a seller and a buyer. The computer program product may be distributed in the form of a machine-readable storage medium (e.g., compact disc read-only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as a memory of the manufacturer's server, a server of the application store, or a relay server.

According to embodiments, each component (e.g., a module or a program) of the above-described components may include a single entity or multiple entities, and some of the multiple entities may be separately disposed in different components. According to embodiments, one or more of the above-described components or operations may be omitted, or one or more other components or operations may be added. Alternatively or additionally, a plurality of components (e.g., modules or programs) may be integrated into a single component. In such a case, according to embodiments, the integrated component may still perform one or more functions of each of the plurality of components in the same or similar manner as they are performed by a corresponding one of the plurality of components before the integration. According to embodiments, operations performed by the module, the program, or another component may be carried out sequentially, in parallel, repeatedly, or heuristically, or one or more of the operations may be executed in a different order or omitted, or one or more other operations may be added.

Figure 3:
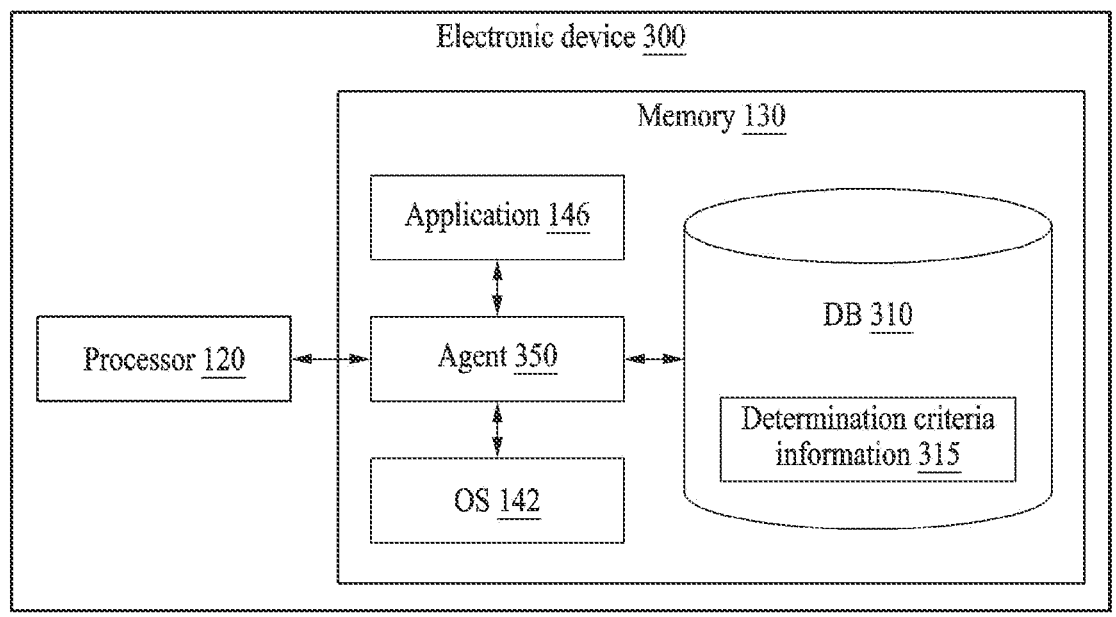
FIG. 3 is a block diagram illustrating an electronic device according to an embodiment of the disclosure.

FIG. 3 is a block diagram illustrating an electronic device according to an embodiment of the disclosure.

Referring to FIG. 3, an electronic device 300 (e.g., the electronic device 101 of FIG. 1) may include one or more applications 146 and a memory 130 for storing a database 310 storing determination criteria information 315 to determine an abnormal operation of the applications 146, an agent 350 that is loaded from the memory 130 and controls a process of the applications 146, and a processor 120 for driving the agent 350.

According to an embodiment, the processor 120 may be the processor 120 of FIG. 1, and the memory 130 may be the memory 130 of FIG. 1. As described with reference to FIGS. 1 and 2, the memory 130 may store various pieces of data used by at least one component (e.g., the processor 120 or a sensor module (e.g., the sensor module 176 of FIG. 1)) of the electronic device 300 (e.g., the electronic device 101 of FIG. 1). The various pieces of data may include, for example, software (e.g., the program 140 of FIG. 1) and input data or output data for a command related to the software. The memory 130 may include, for example, a volatile memory (e.g., the volatile memory 132 of FIG. 1) or a non-volatile memory (e.g., the non-volatile memory 134 of FIG. 1). A program (e.g., the program 140) may be stored as the software in the memory 130, and may include, for example, an OS 142, a middleware (e.g., the middleware 144 of FIG. 1), or the application 146. The agent 350 may be implemented as one function module in the OS 142 or as a separate application.

According to an embodiment, the agent 350 may receive state information related to an abnormal operation of the applications 146 from the OS 142. According to an embodiment, the abnormal operation may include a sluggish operation, the application not responding (ANR), and a crash.

According to an embodiment, state information related to the sluggish operation of the abnormal operation may include a system temperature, an error code of a server communicating with the application 146, an execution time of the application 146, an entry time of the application 146, and a log output from an application manager (e.g., the application manager 201 of FIG. 2).

According to an embodiment, state information related to the ANR of the abnormal operation may include information on a UI thread and the log output from the application manager (e.g., the application manager 201 of FIG. 2).

According to an embodiment, state information related to the crash of the abnormal operation may include an erroneous access (e.g., access to a memory address that does not exist) to the memory 130.

According to an embodiment, the agent 350 may store the determination criteria information 315 in the database 310. According to an embodiment, the determination criteria information 315 may be information to determine a target application in which an abnormal operation is expected from the state information received from the OS 142.

According to an embodiment, the determination criteria information 315 may include information on a system temperature when an execution clock of a CPU is restricted, a package name and process identifier (PID) of a frequently used application among applications in which an abnormal operation has occurred, and/or an average entry time of each of the applications 146.

According to an embodiment, the agent 350 may determine the target application in which the abnormal operation is expected based on the determination criteria information 315. The method of determining the target application by the agent 350 is described in detail with reference to FIGS. 4 to 9.

According to an embodiment, the agent 350 may preload, in the background, the target application in which the abnormal application is expected. According to an embodiment, the agent 350 may determine the target application and pre-execute the target application in the background and may maintain the target application in a cache process. According to an embodiment, when the abnormal operation occurs, the agent 350 may notify a user of the occurrence of the abnormal operation through a pop-up and may switch to a process maintained in the background. According to an embodiment, the agent 350 may switch to the process without a user input when the abnormal operation occurs. According to an embodiment, the agent 350 may switch to the process when there is a user input for the pop-up after the abnormal operation occurs.

According to an embodiment, when switching the process, an existing page may be maintained. According to an embodiment, when the process is switched on a page requiring authentication, such as a card data input, or in a bank application, the main page of a running application may be output.

Figure 4:
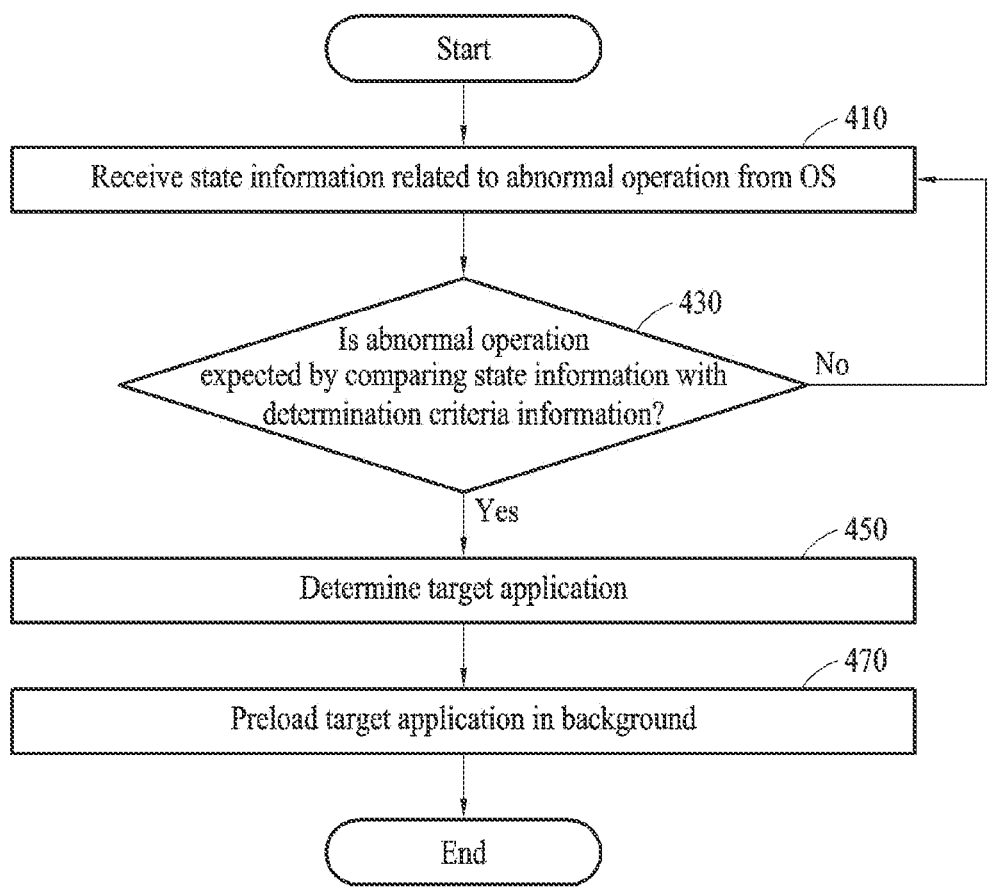
FIG. 4 is a flowchart illustrating an operating method of the electronic device according to an embodiment of the disclosure.

FIG. 4 is a flowchart illustrating an operating method of the electronic device according to an embodiment of the disclosure.

Referring to FIG. 4, in operation 410, an agent (e.g., the agent 350 of FIG. 3) of an electronic device (e.g., the electronic device 101 of FIG. 1 and the electronic device 300 of FIG. 3) may receive state information related to an abnormal operation from an OS (e.g., the OS 142 of FIG. 1).

According to an embodiment, in operation 430, the agent may determine whether the abnormal operation is expected by comparing the state information with determination criteria information (e.g., the determination criteria information 315 of FIG. 3). As described with reference to FIG. 3, the determination criteria information may be pre-stored in a database (e.g., the database 310 of FIG. 3).

According to an embodiment, in operation 450, a target application in which the abnormal operation is expected may be determined. According to an embodiment, the target application may be determined based on the state information and the determination criteria information.

According to an embodiment, in operation 470, the target application may be preloaded in the background. According to an embodiment, the agent may determine a system resource state, and when determining that there is no problem in generating a new process, may preload the target application in the background.

According to an embodiment, when an execution clock of a CPU is restricted due to a high system temperature, a sluggish operation may occur because an application (e.g., the application 146 of FIG. 1) may not use sufficient CPU performance at a time of execution. The agent may receive information on a system temperature from the OS, may identify a temperature at which the execution clock of the CPU is restricted from the determination criteria information, and may determine the possibility of the sluggish operation. According to an embodiment, the agent may determine the target application by parsing a frequently used application among applications in which the sluggish operation has occurred. The method of determining the target application when the state information related to the abnormal operation is the system temperature is described in detail with reference to FIG. 5.

According to an embodiment, when there is a network response problem, the sluggish operation may occur in the application (e.g., the application 146 of FIG. 1). According to an embodiment, the agent may receive information (e.g., an error code of a server communicating with an application) on a network response from the OS and may determine that there is the possibility of the sluggish operation when the error code continuously occurs for a time greater than or equal to a predetermined time. According to an embodiment, the agent may determine the application communicating with the server where the error code continuously occurs to be the target application. The method of determining the target application when the state information related to the abnormal operation is the error code of the server communicating with the application is described in detail with reference to FIG. 6.

According to an embodiment, when the execution of an application is not completed in a predetermined time from a time when the execution of the application is triggered, the sluggish operation may occur in the application. According to an embodiment, the agent may receive information on the execution time of each application from the OS and may determine that there is the possibility of the sluggish operation when the execution of the application is not completed in the predetermined time from the time when the execution of the application is triggered. According to an embodiment, the agent may determine the application of which the execution is not completed in the predetermined time from the time when the execution is triggered to be the target application. The method of determining the target application when the state information related to the abnormal operation is the execution time of an application is described in detail with reference to FIG. 7.

According to an embodiment, the sluggish operation may occur when an entry time of an application increases. According to an embodiment, the agent may receive information on the entry time of applications from the OS and may determine whether an application has the possibility of the sluggish operation based on the information. According to an embodiment, the agent may calculate an average entry time of each application, may store calculated average entry times in the database (e.g., the database 310 of FIG. 3), and may determine an application in which the entry time is greater than or equal to a predetermined time than the average entry time to be the target application. The method of determining the target application when the state information related to the abnormal operation is the entry time of an application is described in detail with reference to FIG. 8.

According to an embodiment, when there is no response from a user interface (UI) thread, the ANR may occur. According to an embodiment, the agent may receive information on the UI thread of the electronic device (e.g., the electronic device 101 of FIG. 1 or the electronic device 300 of FIG. 3) from the OS and may determine an application having the possibility of the ANR based on the information. According to an embodiment, the agent may receive the information on the UI thread of each application and may determine an application in which the UI thread does not respond for a time greater than or equal to a predetermined time to be the target application. The method of determining the target application when the state information related to the abnormal operation is the information on the UI thread is described in detail with reference to FIG. 9.

According to an embodiment, the agent may determine the target application where the ANR is expected based on a log output from an application manager (e.g., the application manager 201 of FIG. 2). According to an embodiment, the application manager in an Android OS may be an activity manager. According to an embodiment, the agent may determine the target application based on a package name and PID of the log output from the application manager.

According to an embodiment, the types of the ANR may include KeyDispatchTimeout, BroadcastTimeout, and ServiceTimeout. Although the occurrence time varies depending on manufacturers or OS versions, the ANR may occur when there is no response for 10 seconds in case of KeyDispatchTimeout, 60 seconds in the background and 10 seconds in the foreground in case of BroadcastTimeout, and 30 seconds in the foreground and/or 300 seconds in the background in case of ServiceTimeout.

According to an embodiment, the log output from the application manager when the ANR occurs may be as follows:

08-22 00:31:36.734 1000 1360 29071 E ActivityManager: ANR in com.brave.browser

Figure 5:
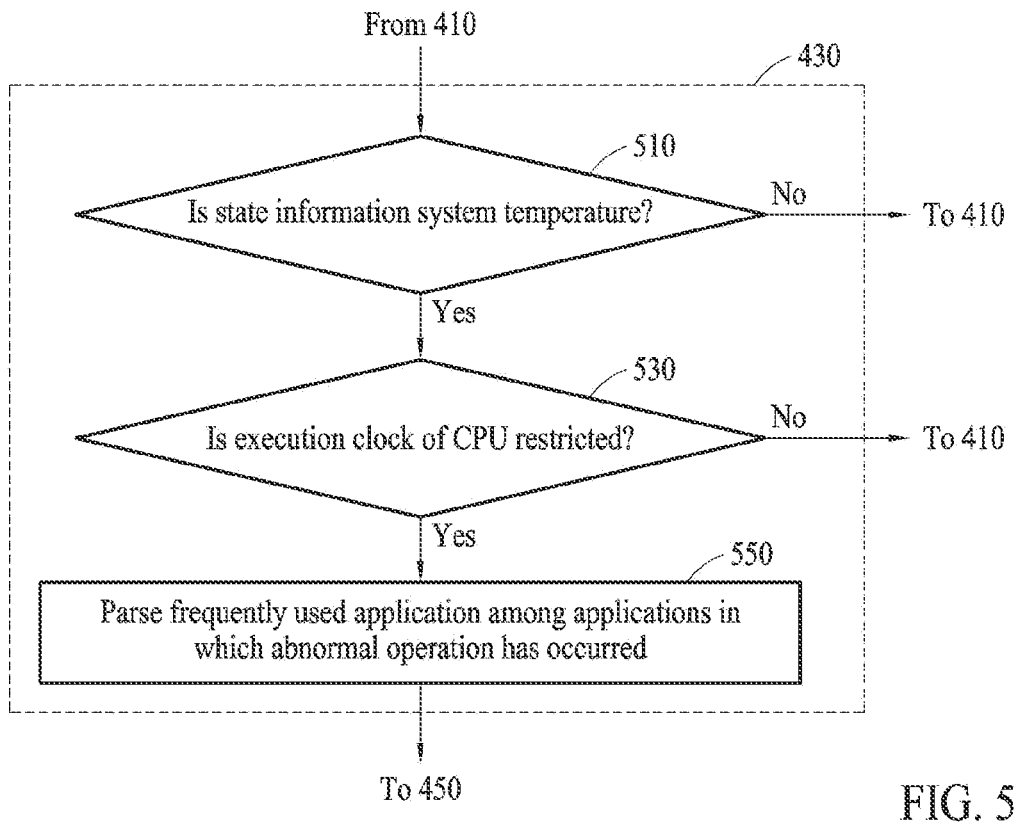
FIG. 5 is a flowchart illustrating a method of preloading an application according to a system temperature by the electronic device according to an embodiment of the disclosure.

FIG. 5 is a flowchart illustrating a method of preloading an application according to a system temperature by the electronic device according to an embodiment of the disclosure.

Referring to FIG. 5, in operation 510, a method of determining a target application when state information related to an abnormal operation received from an OS (e.g., the OS 142 of FIG. 1) by an agent (e.g., the agent 350 of FIG. 3) is a system temperature is described.

According to an embodiment, in operation 530, the agent may monitor whether an execution clock of a CPU is restricted due to a high system temperature. According to an embodiment, the determination of whether the execution clock is restricted may also be received from the OS, and information on a system temperature at which the execution clock has been restricted may be stored as determination criteria information (e.g., the determination criteria information 315 of FIG. 3) in a database (e.g., the database 310 of FIG. 3).

According to an embodiment, in operation 550, the agent may parse a frequently used application among applications in which a sluggish operation, the ANR, or a crash has occurred due to the restriction of the execution clock of the CPU with the system temperature increasing to a temperature greater than or equal to a certain temperature in running applications. According to an embodiment, information (e.g., a package name or PID) on the application in which the sluggish operation has occurred and information on the frequently used application may be stored in the database. The agent may determine the target application in operation 450 by parsing an application in operation 550.

Figure 6:
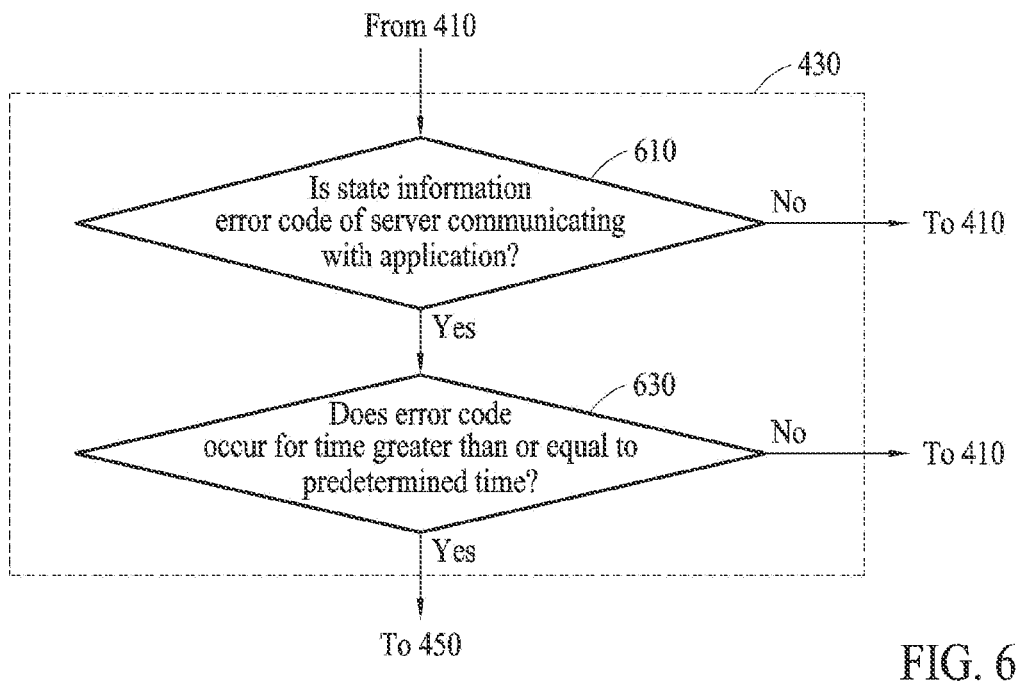
FIG. 6 is a flowchart illustrating a method of determining an application to be preloaded according to a network state by the electronic device according to an embodiment of the disclosure.

FIG. 6 is a flowchart illustrating a method of determining an application to be preloaded according to a network state by the electronic device according to an embodiment of the disclosure.

Referring to FIG. 6, in operation 610, a method of determining a target application when state information related to an abnormal operation received from an OS (e.g., the OS 142 of FIG. 1) by an agent (e.g., the agent 350 of FIG. 3) is an error code of a server communicating with an application (e.g., the application 146 of FIG. 1) is described.

According to an embodiment, when the error code is received from the server for a time greater than or equal to a predetermined time in operation 630, the agent may determine the application communicating with the server to be the target application. According to an embodiment, the application communicating with the server may monitor a response of the server in the OS. According to an embodiment, a sluggish operation may occur in an application, when a media player (e.g., the media player 273 of FIG. 2) is played, and the error code continuously occurs in the server, of applications (e.g., the application 146 of FIG. 2) of an electronic device (e.g., the electronic device 101 of FIG. 1 or the electronic device 300 of FIG. 3). The agent may determine the media player to be the target application and preload the media player when the error code occurring in the server communicating with the media player is continuously received from the OS (e.g., the OS 142 of FIG. 1) before the media player is terminated.

According to an embodiment, the error code occurring in the server may be as follows:
    07-22 23:32:34.393 I 21402 21414 MediaHTTPConnection: response code=403

Figure 7:
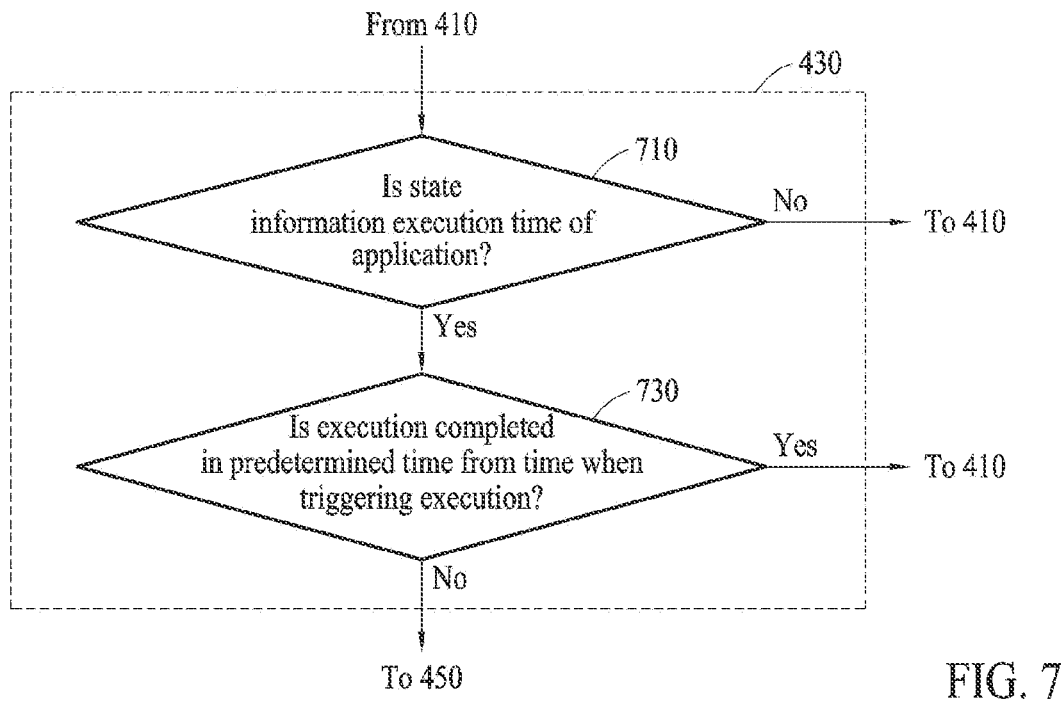
FIG. 7 is a flowchart illustrating a method of determining an application to be preloaded based on an execution time of an application by the electronic device according to an embodiment of the disclosure.

FIG. 7 is a flowchart illustrating a method of determining an application to be preloaded based on an execution time of an application by the electronic device according to an embodiment of the disclosure.

Referring to FIG. 7, in operation 710, a method of determining a target application when state information related to an abnormal operation received from an OS (e.g., the OS 142 of FIG. 1) by an agent (e.g., the agent 350 of FIG. 3) is an execution time of an application (e.g., the application 146 of FIG. 1) is described.

According to an embodiment, in operation 730, the agent may determine an application to be the target application when the execution of the application is not completed in a predetermined time from a time when the execution of the application is triggered. According to an embodiment, when the abnormal operation is a sluggish operation, the agent may monitor the execution time of the application from a log output from an application manager (e.g., the application manager 201 of FIG. 2). According to an embodiment, when the execution of an application is triggered, the agent may monitor whether the execution is completed, and when the execution of the application is not completed in a predetermined time (e.g., 5 seconds), may determine that there is a high possibility of the sluggish operation, and may determine the application to be the target application.

According to an embodiment, the log output from the application manager regarding the execution time of the application may be as follows:
    07-15 10:03:46.441 4914 4945 I ActivityManager: Start proc 2124:com.microsoft.office.outlook/u0a202 for activity {com.microsoft.office.outlook/com.acompli.acompli.CentralActivity}

Figure 8:
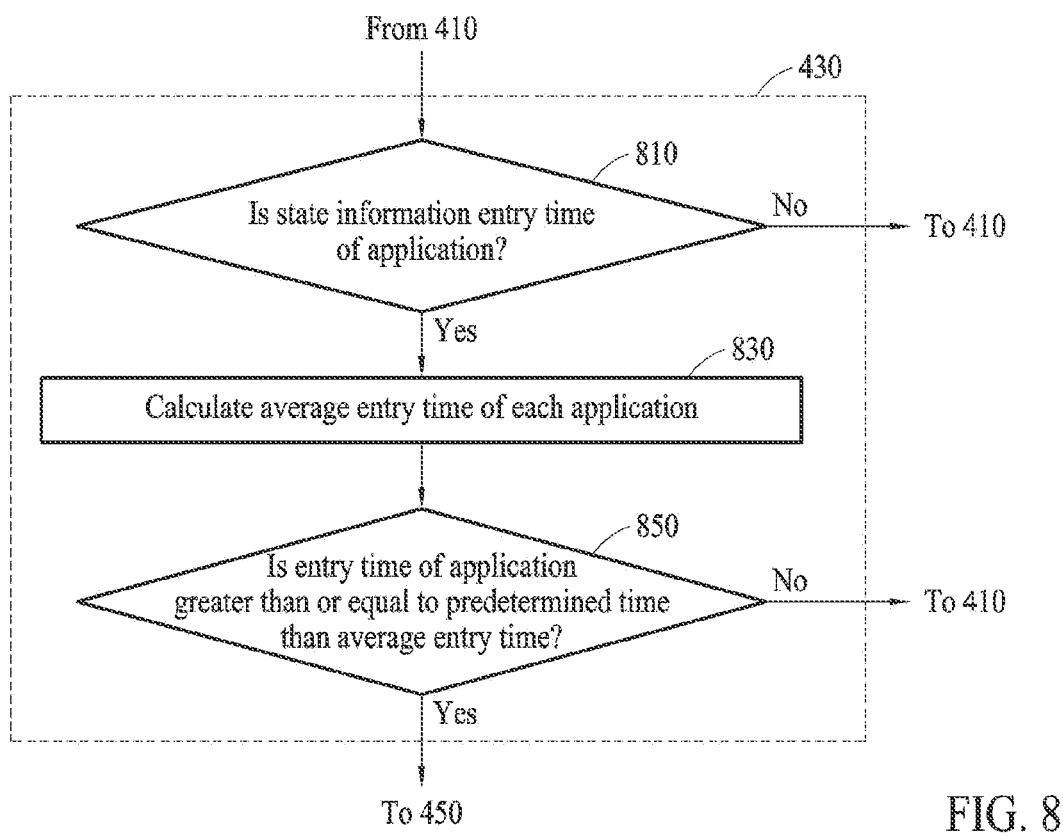
FIG. 8 is a flowchart illustrating a method of determining an application to be preloaded based on an average entry time of an application by the electronic device according to an embodiment of the disclosure.

FIG. 8 is a flowchart illustrating a method of determining an application to be preloaded based on an average entry time of an application by the electronic device according to an embodiment of the disclosure.

Referring to FIG. 8, in operation 810, a method of determining a target application when state information related to an abnormal operation received from an OS (e.g., the OS 142 of FIG. 1) by an agent (e.g., the agent 350 of FIG. 3) is an entry time of an application (e.g., the application 146 of FIG. 1) is described.

According to an embodiment, in operation 830, the agent may calculate an average entry time of each application. According to an embodiment, the agent may store the average entry time of each application in a database (e.g., the database 310 of FIG. 3) as determination criteria information, and when receiving the state information on the entry time of an application from the OS, may obtain an average entry time of the application referring to the determination criteria information. According to an embodiment, the entry time of applications may be collected by a sluggish detector module.

According to an embodiment, in operation 850, the agent may determine an application in which the entry time is greater than or equal to a predetermined time than an average entry time of the application to be the target application. For example, the agent may determine that there is a high possibility of the sluggish operation in an application in which the entry time is greater than or equal to a certain time (e.g., 10 seconds) than the average entry time and may determine the application to be the target application. For another example, the agent may determine that there is a high possibility of the sluggish operation in an application in which the entry time is greater than or equal to a certain proportion (e.g., 80%) of the average entry time and may determine the application to be the target application.

According to an embodiment, the log related to the entry time of an application may be as follows:
    07-15 10:03:50.839 4914 4939 D PkgPredictorService: pkg:com.microsoft.office.outlook activity:com.acompli.acompli.CentralActivity thisTime:4563

Figure 9:
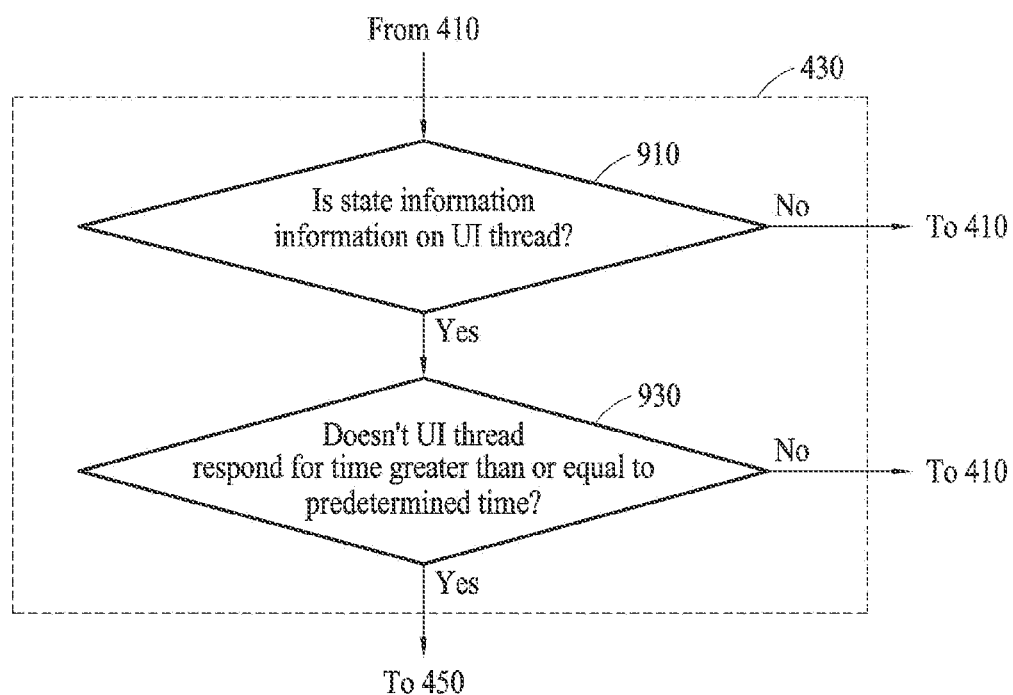
FIG. 9 is a flowchart illustrating a method of determining an application to be preloaded based on a user interface (UI) thread by the electronic device according to an embodiment of the disclosure.

FIG. 9 is a flowchart illustrating a method of determining an application to be preloaded based on a UI thread by the electronic device according to an embodiment of the disclosure.

Referring to FIG. 9, in operation 910, a method of determining a target application when state information related to an abnormal operation received from an OS (e.g., the OS 142 of FIG. 1) by an agent (e.g., the agent 350 of FIG. 3) is the UI thread is described.

According to an embodiment, in operation 930, the agent may monitor the UI thread and may identify whether there is no response for a time greater than or equal to a predetermined time (e.g., 5 seconds). According to an embodiment, based on the information on the UI thread of each application, the agent may determine an application in which the UI thread does not respond for the time greater than or equal to the predetermined time (e.g., 5 seconds) to be the target application.

According to an embodiment, an electronic device (e.g., the electronic device 101 of FIG. 1 or the electronic device 300 of FIG. 3) may include a memory (e.g., the memory 130 of FIG. 1) for storing at least one application (e.g., the application 146 of FIG. 1), a database (e.g., the database 310 of FIG. 3) storing determination criteria information (e.g., the determination criteria information 315 of FIG. 3) to determine an abnormal operation of the at least one application, and an agent (e.g., the agent 350 of FIG. 3) configured to control a process of the at least one application, and a processor (e.g., the processor 120 of FIG. 1), coupled to the memory, configured to execute the agent.

According to an embodiment, the processor may receive state information related to an abnormal operation of the at least one application from an OS (e.g., the OS 142 of FIG. 1), may determine a target application from the at least one application in which the abnormal operation is expected based on the determination criteria information, and may preload the target application in the background. The at least one application may be a plurality of applications.

According to an embodiment, when the state information is a system temperature, the processor may determine the target application to be a frequently used application among applications in which the abnormal operation has occurred from among the plurality of application when an execution clock of a CPU is restricted.

According to an embodiment, when the state information is an error code of a server communicating with an application, the processor may determine the target application to be an application among the plurality of application in which the error code occurs for a time greater than or equal to a predetermined time.

According to an embodiment, when the state information is the execution time of an application, the processor may determine the target application to be an application among the plurality of application in which the execution of the application is not completed in a predetermined time from a time when the execution of the application is triggered.

According to an embodiment, when the state information is the entry time of an application, the processor may calculate an average entry time of each of the plurality of applications and may determine the target application to be an application among the plurality of application in which the entry time is greater than or equal to a predetermined time than the average entry time.

According to an embodiment, when the state information is information on a UI thread, the processor may determine the target application to be an application among the plurality of application in which the UI thread does not respond for a time greater than or equal to a predetermined time.

According to an embodiment, when the state information is a log output from an application manager (e.g., the application manager 201 of FIG. 2), the processor may determine the target application among the plurality of application based on the log.

According to an embodiment, the abnormal operation may include one of a sluggish operation, the ANR, or a crash.

According to an embodiment, an operating method of the electronic device (e.g., the electronic device 101 of FIG. 1 or the electronic device 300 of FIG. 3) may include receiving the state information related to the abnormal operation of at least one application (e.g., the application 146 of FIG. 1) from the OS (e.g., the OS 142 of FIG. 1), determining the target application from the at least one application in which the abnormal operation is expected based on the determination criteria information (e.g., the determination criteria information 315 of FIG. 3) that is stored in the database (e.g., the database 310 of FIG. 3); and preloading the target application in the background. The at least one application may include a plurality of applications.

According to an embodiment, the operating method of the electronic device (e.g., the electronic device 101 of FIG. 1 or the electronic device 300 of FIG. 3) may further include, when the state information is the system temperature, determining the target application to be a frequently used application among the applications in which the abnormal operation has occurred from among the plurality of application when the execution clock of the CPU is restricted.

According to an embodiment, the operating method of the electronic device (e.g., the electronic device 101 of FIG. 1 or the electronic device 300 of FIG. 3) may further include, when the state information is the error code of the server communicating with an application, determining the target application to be an application among the plurality of application in which the error code occurs for the time greater than or equal to the predetermined time.

According to an embodiment, the operating method of the electronic device (e.g., the electronic device 101 of FIG. 1 or the electronic device 300 of FIG. 3) may further include, when the state information is the execution time of an application, determining the target application to be an application among the plurality of application in which the execution of the application is not completed in the predetermined time from the time when the execution of the application is triggered.

According to an embodiment, the operating method of the electronic device (e.g., the electronic device 101 of FIG. 1 or the electronic device 300 of FIG. 3) may further include, when the state information is the entry time of an application, calculating an average entry time of each of the plurality of applications and determining the target application to be an application among the plurality of application in which the entry time is greater than or equal to the predetermined time than the average entry time.

According to an embodiment, the operating method of the electronic device (e.g., the electronic device 101 of FIG. 1 or the electronic device 300 of FIG. 3) may further include, when the state information is information on the UI thread, determining the target application to be an application among the plurality of application in which the UI thread does not respond for the time greater than or equal to the predetermined time.

According to an embodiment, the operating method of the electronic device (e.g., the electronic device 101 of FIG. 1 or the electronic device 300 of FIG. 3) may further include, when the state information is a log output from the application manager (e.g., the application manager 201 of FIG. 2), determining the target application among the plurality of applications based on the log.

According to an embodiment, the abnormal operation may include one of a sluggish operation, the ANR, or a crash.

According to an embodiment, a non-transitory computer-readable recording medium is provided. The non-transitory computer-readable recording configured to store a program which, when executed by a processor of an electronic device (e.g., the electronic device 101 of FIG. 1 or the electronic device 300 of FIG. 3) causes the processor to control the electronic device to receive the state information related to the abnormal operation of at least one application (e.g., the application 146 of FIG. 1) from the OS (e.g., the OS 142 of FIG. 1), determine the target application in which the abnormal operation is expected based on the determination criteria information (e.g., the determination criteria information 315 of FIG. 3) that is stored in the database (e.g., the database 310 of FIG. 3), and preload the target application in the background.

According to an embodiment, the non-transitory computer-readable recording medium) may further store a program such that the electronic device, when the state information is the system temperature, may determine the target application to be a frequently used application among the applications in which the abnormal operation has occurred from among the plurality of applications when the execution clock of the CPU is restricted.

According to an embodiment, the non-transitory computer-readable recording medium may further store a program such that the electronic device, when the state information is the execution time of an application, may determine the target application to be an application among the plurality of applications in which the execution of the application is not completed in the predetermined time from the time when the execution of the application is triggered.

According to an embodiment, the non-transitory computer-readable recording medium may further store a program such that the electronic device, when the state information is information on the UI thread, may determine the target application to be an application among the plurality of applications in which the UI thread does not respond for the time greater than or equal to the predetermined time.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a processor comprising processing circuitry; and
   memory storing:
      at least one application,
      a database storing determination criteria information to determine an abnormal operation of the at least one application, and
      an agent configured to control a process of the at least one application,
   wherein the agent, when executed by the processor, causes the electronic device to:
      receive state information related to the abnormal operation of the at least one application from an operating system (OS),
      determine whether the abnormal operation of the at least one application is expected by comparing the state information with the determination criteria information,
      determine a target application from the at least one application in which an abnormal operation is expected based on the determination criteria information,
      preload the target application in a background, and
      in response to detecting abnormal operation of the target application, switch to a background process.

2. The electronic device of claim 1,
   wherein the at least one application comprises a plurality of applications, and
   wherein the agent, when executed by the processor, further causes the electronic device to: when the state information is a system temperature, determine the target application to be a frequently used application among applications in which the abnormal operation has occurred from among the plurality of applications when an execution clock of a central processing unit (CPU) is restricted.

3. The electronic device of claim 1,
   wherein the at least one application comprises a plurality of applications, and
   wherein the agent, when executed by the processor, further causes the electronic device to: when the state information is an error code of a server configured to communicate with an application, determine the target application to be an application among the plurality of applications in which the error code occurs for a time greater than or equal to a predetermined time.

4. The electronic device of claim 1,
   wherein the at least one application comprises a plurality of applications, and
   wherein the agent, when executed by the processor, further causes the electronic device to: when the state information is an execution time of an application, determine the target application to be an application among the plurality of applications in which an execution of the application is not completed in a predetermined time from a time when the execution of the application is triggered.

5. The electronic device of claim 1,
   wherein the at least one application comprises a plurality of applications, and
   wherein the agent, when executed by the processor, further causes the electronic device to: when the state information is an entry time of an application:
      calculate an average entry time of each of the plurality of applications, and
      determine the target application to be an application among the plurality of applications in which the entry time is greater than or equal to a predetermined time than the average entry time.

6. The electronic device of claim 1,
   wherein the at least one application comprises a plurality of applications, and
   wherein the agent, when executed by the processor, further causes the electronic device to: when the state information is information on a user interface (UI) thread, determine the target application to be an application among the plurality of applications in which the UI thread does not respond for a time greater than or equal to a predetermined time.

7. The electronic device of claim 1,
   wherein the at least one application comprises a plurality of applications, and
   wherein the agent, when executed by the processor, further causes the electronic device to: when the state information is a log that is output from an application manager, determine the target application among the plurality of applications based on the log.

8. The electronic device of claim 1, wherein the abnormal operation comprises one of a sluggish operation, the application not responding (ANR), or a crash.

9. An operating method of an electronic device, the operating method comprising:
   receiving state information related to an abnormal operation of at least one application from an operating system (OS);
   determining whether the abnormal operation of the at least one application is expected by comparing the state information with determination criteria information for determining the abnormal operation of the at least one application;
   determining a target application from the at least one application in which an abnormal operation is expected based on determination criteria information to determine the abnormal operation of the applications that are stored in a database;

preloading the target application in a background; and in response to detecting abnormal operation of the target application, switching to a background process.

10. The operating method of claim 9, wherein the at least one application comprises a plurality of applications, and wherein the operating method further comprises:

when the state information is a system temperature, determining the target application to be a frequently used application among applications in which the abnormal operation has occurred from among the plurality of applications when an execution clock of a central processing unit (CPU) is restricted.

11. The operating method of claim 9, wherein the at least one application comprises a plurality of applications, and wherein the operating method further comprises:

when the state information is an error code of a server configured to communicate with an application, determining the target application to be an application among the plurality of applications in which the error code occurs for a time greater than or equal to a predetermined time.

12. The operating method of claim 9, wherein the at least one application comprises a plurality of applications, and wherein the operating method further comprises:

when the state information is an execution time of an application, determining the target application to be an application among the plurality of applications in which an execution of the application is not completed in a predetermined time from a time when the execution of the application is triggered.

13. The operating method of claim 9, wherein the at least one application comprises a plurality of applications, and wherein the operating method further comprises:

when the state information is information on a UI thread, determining the target application to be an application among the plurality of applications in which the UI thread does not respond for a time greater than or equal to a predetermined time.

14. The operating method of claim 9, wherein the abnormal operation comprises one of a sluggish operation, the application not responding (ANR), or a crash.

15. A non-transitory computer-readable recording medium configured to store a program which, when executed by a processor of an electronic device, causes the electronic device to:

receive state information related to an abnormal operation of at least one application from an operating system (OS), determine whether the abnormal operation of the at least one application is expected by comparing the state information with determination criteria information for determining the abnormal operation of the at least one application, determine a target application from the at least one application in which an abnormal operation is expected based on determination criteria information to determine the abnormal operation of the at least one application stored in a database, preload the target application in a background, and in response to detecting abnormal operation of the target application, switch to a background process.

\* \* \* \* \*